Patented Feb. 21, 1928.

1,659,999

UNITED STATES PATENT OFFICE.

CLAUDIUS H. M. ROBERTS, OF EL DORADO, ARKANSAS, ASSIGNOR TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing.    Application filed December 10, 1926.   Serial No. 154,040.

This invention relates to the treatment of emulsions of mineral oil and water, such as petroleum emulsions, for the purpose of separating the oil from the water.

Petroleum emulsions are of the water-in-oil type and comprise fine droplets of natural occurring waters or brines dispersed in a more or less permanent state throughout the oil which constitutes the continuous phase of the emulsion. They are obtained from producing wells and from the bottoms of oil storage tanks and are commonly referred to as "cut oil", "roily oil", "emulsified oil" and "bottom settlings."

The object of my invention is to provide a novel and inexpensive process for breaking or separating petroleum emulsions of the character referred to into their component parts of oil and water or brine.

My process is similar to conventional chemical processes for breaking petroleum emulsions, in that it contemplates subjecting the emulsion to the action of a chemical demulsifying agent preparatory to "settling" the emulsion or subjecting it to other treatment that assists or facilitates the emulsion to break, but it differs from chemical processes of the prior art used to break petroleum emulsions, in that the chemical demulsifying agent which is used consists of a water soluble salt of a complex mixture that comprises a fatty acid, an aromatic sulphonic acid, a sulpho-aromatic fatty acid, an alcohol, an unsaponified fatty material and an aromatic body. From tests that I have made with my improved demulsifying agent I have found that it is superior to the demulsifying agents heretofore used in treating petroleum emulsions under ground or before they are discharged from the well in which they are produced. It is also highly efficient for treating fresh petroleum emulsions after they have been removed from the well, and old petroleum emulsions of long standing.

Various methods can be employed to produce the demulsifying agent above described, but in most instances said agent will be obtained by subjecting a fatty body and an aromatic to such treatment as to convert it into a sulphonated mass, then mixing said sulphonated mass with a free fatty acid, then diluting said mixture with an aromatic liquid, and thereafter reducing it to the proper consistency by means of an alcohol. Subsequently, the entire mass is treated with a suitable base, such as potash or ammonia to bring it to a semi-saponified state.

In order that one skilled in the art may readily prepare my improved demulsifying agent, I will describe one particular procedure that I have employed to produce or manufacture said agent. A reagent of the Twitchell type is first prepared by mixing an unsaponified fatty body, such as oleic acid, with a substantially equal volume of tar acid oil, subjecting said mixture to sulphonation with an excess of sulphuric acid or oleum, washing said sulphonated mass, and separating same by decantation from the wash water, thereby producing a mixture or compound of approximately the following composition:

Unsulphonated fatty material__ 40 parts.
Phenol sulphonic acid _____   5 to 10 parts.
Non-sulphonated aromatic hydrocarbons _____ 30 to 40 parts.
Phenol_____ 12 to 18 parts.

Phenol fatty sulphontes, less than 10 parts.

In preparing the Twitchell type reagent above described olive oil, castor oil or any other suitable similar unsaponified fatty body may be used in place of oleic acid. Obviously, the unsaponified fatty body that is used must be an unsaturated fatty body or glyceride, free from metallic ions, and capable of entering into the well-known Twitchell reaction. For the sake of brevity, I have used the term "suitable unsaponified fatty body" in the claims to mean an unsaturated fatty acid or glyceride of the kind just referred to.

Approximately 75 gals. of the above described compound is then mixed with 37½ gals. of an unsaponified fatty body, of a type suitable for use in the Twitchell reaction previously described, preferably red oil, and subsequently the said mixture is combined with approximately 18½ gals. of tar acid oil, approximately 28 gals. of an aliphatic alcohol, such as denatured alcohol, and approximately 20 gals. of aqueous ammonia. Instead of using a diluent consisting of tar acid oil, any suitable liquid aromatic can be used as the diluent, such as cresylic acid or tetralin. Methyl alcohol can also be used in place of denatured alcohol and any other suitable base, such as an aqueous solution of potash, can be used in place of the ammonia above described.

The compound that results from the above procedure consists of a water soluble salt of a mixture of a fatty acid, an aromatic sulphonic acid and a sulpho-aromatic fatty acid, combined with or dissolved in a solution that comprises water, alcohol, an unsaponified fatty substance and an aromatic substance.

While I have found that excellent results are attained with a demulsifying agent composed of substances combined in the proportions specified, I wish it to be understood that the proportions of the various substances used to produce the demulsifying agent above described can be varied within certain limits without departing from the spirit of my invention.

In practising my process the demulsifying agent or compound above described is brought into contact with the petroleum emulsion either by introducing the agent into a well in which the petroleum emulsion is being produced; introducing the agent into a conduit through which the petroleum emulsion is flowing; introducing the agent into a tank in which the emulsion is stored, or introducing said agent into a container that holds sludge obtained from the bottom of an oil storage tank. When my process is used to treat a petroleum emulsion under ground the demulsifying agent is preferably introduced into a producing well in such a way that it can become mixed with the water or oil that is emerging from the ground before said water and oil enter the barrel of the well pump or the tubing up through which said water and oil flow to the surface of the ground. After any of the various treatments above referred to the emulsion is allowed to stand in a quiescent state at suitable temperature, so as to permit the water or brine to separate from the oil, or it may be passed through a variety of apparatus, such as hay tanks, gun barrels, etc., such as are now commonly used for "breaking" petroleum emulsions. It may even be passed through a heating apparatus, a centrifugal or an electrical dehydrator, or an emulsifying device with or without the addition of water to the emulsion, or it may be subjected to action by a combination of two or more of the devices above referred to.

Having thus described my invention, what I claim as new and desire to secure by Letters Patent is:

1. A process for breaking or separating petroleum emulsions, characterized by subjecting the emulsion to the action of a demulsifying agent consisting of a water-soluble salt of a mixture, comprising a fatty acid, an aromatic sulphonic acid and a sulpho-aromatic fatty acid, dissolved in or mixed with an alcohol, an unsaponified fatty body and a non-sulphonated aromatic substance.

2. A process for breaking or separating petroleum emulsions, characterized by subjecting the emulsion to the action of a demulsifying agent consisting of a sulphonated mass obtained from a suitable fatty body and a liquid aromatic mixed with a free unsaponified fatty acid, a liquid aromatic material and an alcohol, and treated with a suitable base to convert it into a semi-saponified state.

3. A process for breaking or separating petroleum emulsions, characterized by subjecting the emulsion to the action of a demulsifying agent consisting of a sulphonated mass obtained by treating a suitable unsaponified fatty body and tar acid oil with sulphuric acid, and mixed with a liquid aromatic, an alcohol, and a suitable base that will convert the mixture into a semi-saponified state.

4. A process for breaking or separating petroleum emulsions, characterized by subjecting the emulsion to the action of a demulsifying agent composed of a suitable unsaponified fatty body and tar acid oil, mixed in approximately equal proportions and subjected to sulphonation and subsequently combined with red oil, a liquid aromatic, an alcohol, and a base that will convert the mixture into a semi-saponified state.

5. A process for breaking or separating petroleum emulsions, characterized by subjecting the emulsion to the action of a demulsifying agent consisting of tar acid oil and oleic acid mixed in approximately equal proportions and subjected to sulphonation and combined with red oil, tar acid oil, an alcohol and ammonia.

CLAUDIUS H. M. ROBERTS.